United States Patent
Heo et al.

(10) Patent No.: US 9,035,516 B2
(45) Date of Patent: May 19, 2015

(54) HYDRODYNAMIC BEARING ASSEMBLY AND MOTOR INCLUDING THE SAME

(71) Applicant: Samsung Electro-Mechanics Co., Ltd., Suwon (KR)

(72) Inventors: Myeung Hwa Heo, Suwon (KR); Won Ki Park, Suwon (KR); Satoru Sodeoka, Suwon (KR)

(73) Assignee: SAMSUNG ELECTRO-MECHANICS CO., LTD., Suwon-Si (KR)

( * ) Notice: Subject to any disclaimer, the term of this patent is extended or adjusted under 35 U.S.C. 154(b) by 0 days.

(21) Appl. No.: 13/785,660

(22) Filed: Mar. 5, 2013

(65) Prior Publication Data

US 2014/0159525 A1 Jun. 12, 2014

(30) Foreign Application Priority Data

Dec. 12, 2012 (KR) .......... 10-2012-0144257

(51) Int. Cl.
| | |
|---|---|
| H02K 5/16 | (2006.01) |
| G11B 17/02 | (2006.01) |
| F16C 32/06 | (2006.01) |
| F16C 33/02 | (2006.01) |
| H02K 7/08 | (2006.01) |
| H02K 5/167 | (2006.01) |
| F16C 17/02 | (2006.01) |
| F16C 33/10 | (2006.01) |

(52) U.S. Cl.
CPC ............. *H02K 7/08* (2013.01); *H02K 5/1675* (2013.01); *H02K 7/085* (2013.01); *F16C 2370/12* (2013.01); *F16C 17/026* (2013.01); *F16C 33/106* (2013.01); *F16C 33/1085* (2013.01)

(58) Field of Classification Search
CPC ............ H02K 5/16; H02K 7/08; F16C 17/10; F16C 33/10; G11B 17/02
USPC .................. 310/90; 360/99.08; 384/107, 112
See application file for complete search history.

(56) References Cited

U.S. PATENT DOCUMENTS

| | | | |
|---|---|---|---|
| 6,271,612 B1* | 8/2001 | Tanaka et al. ................... 310/90 |
| 2005/0025405 A1* | 2/2005 | Tamaoka ....................... 384/107 |
| 2006/0158052 A1* | 7/2006 | Yamamoto ..................... 310/90 |
| 2011/0031833 A1* | 2/2011 | Yu ................................. 310/90 |
| 2011/0200279 A1* | 8/2011 | Goto ............................. 384/107 |
| 2013/0033138 A1* | 2/2013 | Yu ................................. 310/90 |

FOREIGN PATENT DOCUMENTS

| | | | |
|---|---|---|---|
| JP | 2007024267 A | * | 2/2007 |
| KR | 2001-0010451 | | 2/2001 |

* cited by examiner

*Primary Examiner* — Jose Gonzalez Quinone

(57) ABSTRACT

There are provided a hydrodynamic bearing assembly and a motor including the same. The hydrodynamic bearing assembly includes a sleeve rotatably supporting a shaft and including a first circulation hole formed therein, the first circulation hole penetrating between an inner peripheral surface thereof and an outer peripheral surface thereof; a sleeve housing into which the sleeve is inserted; and a second circulation hole formed between the outer peripheral surface of the sleeve and an inner peripheral surface of the sleeve housing to be in communication with the first circulation hole, wherein an upper portion of the second circulation hole has a larger diameter than a lower portion thereof in an axial direction.

13 Claims, 5 Drawing Sheets

HYDRODYNAMIC BEARING ASSEMBLY AND MOTOR INCLUDING THE SAME

CROSS-REFERENCE TO RELATED APPLICATIONS

This application claims the priority of Korean Patent Application No. 10-2012-0144257 filed on Dec. 12, 2012, in the Korean Intellectual Property Office, the disclosure of which is incorporated herein by reference.

BACKGROUND OF THE INVENTION

1. Field of the Invention

The present invention relates to a hydrodynamic bearing assembly and a motor including the same.

2. Description of the Related Art

In general, a hard disk drive (HDD), an information storage device, reads data stored on a disk or writes data to a disk using a read/write head.

The hard disk drive requires a disk driving device capable of driving the disk. In the disk driving device, a small-sized spindle motor is used.

The small spindle motor uses a hydrodynamic bearing assembly. A lubricating fluid is interposed between a shaft and a sleeve of the hydrodynamic bearing assembly, such that the shaft is supported by fluid pressure generated in the lubricating fluid.

In addition, the lubricating fluid injected into the hydrodynamic bearing assembly may be leaked to the outside by an impact or an amount of lubricating fluid may be reduced by evaporation. Due to this phenomenon, the hydrodynamic bearing may fail to generate pressure, a problem in performance and a lifespan of the spindle motor may be generated.

Therefore, research into a technology for significantly improving performance and a lifespan of a spindle motor by preventing leakage of lubricating fluid in a hydrodynamic bearing assembly has been urgently demanded.

SUMMARY OF THE INVENTION

An aspect of the present invention provides a hydrodynamic bearing assembly capable of increasing a storage space of a lubricating fluid and suppressing evaporation of the lubricating fluid, and a motor including the same.

According to an aspect of the present invention, there is provided a hydrodynamic bearing assembly including: a sleeve rotatably supporting a shaft and including a first circulation hole formed therein, the first circulation hole penetrating between an inner peripheral surface thereof and an outer peripheral surface thereof; a sleeve housing into which the sleeve is inserted; and a second circulation hole formed between the outer peripheral surface of the sleeve and an inner peripheral surface of the sleeve housing to be in communication with the first circulation hole, wherein an upper portion of the second circulation hole has a larger diameter than a lower portion thereof in an axial direction.

The sleeve housing may include a closing part disposed below the shaft and the sleeve, an extension part extended from the closing part in the axial direction and coupled to the sleeve, and a tapered part extended from the extension part and having an inner diameter increasing upwardly in the axial direction.

The tapered part may have an outer diameter increasing upwardly in the axial direction.

The second circulation hole formed between an inner peripheral surface of the tapered part and the outer peripheral surface of the sleeve may have a diameter increasing upwardly in the axial direction.

The sleeve housing may be formed by plastically deforming a steel sheet.

An upper portion of the sleeve may be provided with a protrusion part protruding in an outer radial direction.

A communication channel may be formed between an upper surface of the sleeve housing and a lower surface of the protrusion part so that the second circulation hole is in communication with an outside of the sleeve housing.

The second circulation hole may be formed by cutting a portion of the outer peripheral surface of the sleeve.

The hydrodynamic bearing assembly may further include a rotor fixed to the shaft to rotate together with the shaft.

The rotor may include a main wall part protruding from one surface thereof to face an outer peripheral surface of the sleeve housing.

The outer peripheral surface of the sleeve housing and an inner peripheral surface of the main wall part may form a sealing part therebetween, the sealing part allowing a lubricating fluid to be sealed.

An outer peripheral surface of an upper portion of the sleeve housing may be tapered to seal the lubricating fluid between the outer peripheral surface of the upper portion of the sleeve housing and the inner peripheral surface of the main wall part.

According to another aspect of the present invention, there is provided a motor including: the hydrodynamic bearing assembly as described above; and a stator coupled to the hydrodynamic bearing assembly and including a core having a coil wound therearound in order to generate rotational driving force.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
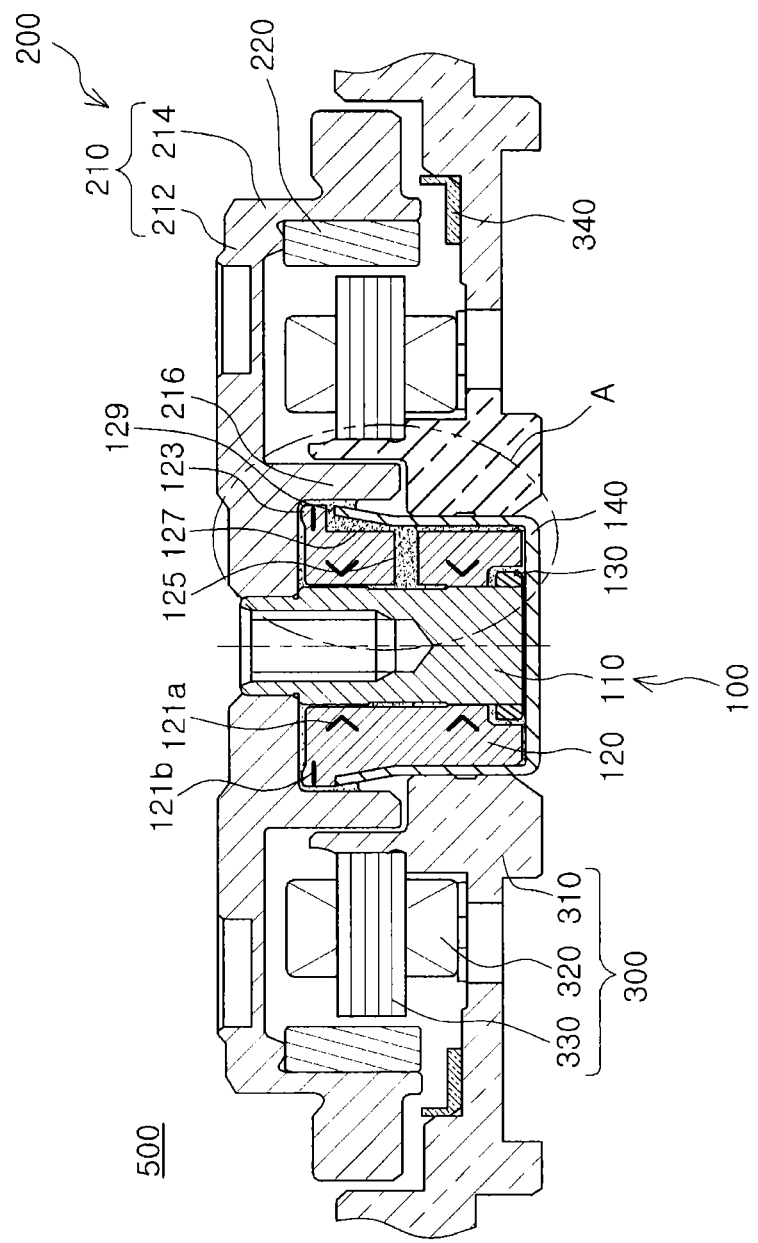
FIG. 1 is a schematic cross-sectional view of a motor including a hydrodynamic bearing assembly according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a schematic cross-sectional view of a motor including a hydrodynamic bearing assembly according to an embodiment of the present invention.

Referring to FIG. 1, a motor 500 according to an embodiment of the present invention may include a hydrodynamic bearing assembly 100 and a stator 300.

Terms with respect to directions will be first defined. As viewed in FIG. 1, an axial direction refers to a vertical direction based on a shaft 110, and an outer radial or inner radial direction refers to a direction towards an outer edge of a rotor 200 based on the shaft 110 or a direction towards the center of the shaft 110 based on the outer edge of the rotor 200.

The hydrodynamic bearing assembly 100 may include the shaft 110, a sleeve 120, a thrust plate 130, a sleeve housing 140, and the rotor 200.

The hydrodynamic bearing assembly 100 except for the rotor 200 will be described below in detail with reference to FIGS. 2 through 4.

The stator 300 may include a coil 320, a core 330, a base member 310, and a pulling plate 340.

The stator 300 is a fixed structure including the core 330 having the coil 320 wound therearound, wherein the coil 320 generates electromagnetic force having a predetermined magnitude when power is applied thereto.

The core 330 is fixedly disposed above the base member 310 provided with a printed circuit board (not shown) on which pattern circuits are printed. A plurality of coil holes having a predetermined size are formed to penetrate through the base member 310 to expose the coil 320 downwardly in an upper surface of the base member 310 corresponding to the core 330 having the coil 320 wound therearound. The coil 320 may be electrically connected to the printed circuit board (not shown) in order to supply external power.

The pulling plate 340, a component having attractive force acting in concert with a magnet 220 coupled to the rotor 200, may prevent the rotating member including the shaft 110 and the rotor 200 from being excessively floated.

The shaft 110 and the rotor 200 that are the rotating members of the motor 500 according to the embodiment of the present invention need to be floated at a predetermined height so as to be stably rotated. However, in the case in which the shaft 110 and the rotor 200 are excessively floated at a height greater than a predetermined floating height, it may have a negative effect on performance.

In this case, the base member 310 and the pulling plate 340 may be coupled in order to prevent the rotating members, that is, the shaft 110 and the rotor 200, from being excessively floated, and excessive floating of the rotating members may be prevented by the attractive force acting between the pulling plate 340 and the magnet 220.

The rotor 200 is a rotating structure provided to be rotatable with respect to the stator 300 and may include a rotor case 210 having the annular ring shaped magnet 220, the magnet 220 corresponding to the core 330 while having a predetermined interval therebetween.

Here, the rotor case 210 may include a hub base 212 press-fitted into an upper end of the shaft 110 to thereby be fixed thereto and a magnet support part 214 extended from the hub base 212 in the outer radial direction and bent downwardly in the axial direction to support the magnet 220.

In addition, the magnet 220 may be a permanent magnet generating magnetic force having a predetermined strength by alternately magnetizing an N pole and an S pole thereof in a circumferential direction.

Here, rotational driving of the rotor 200 will be briefly described. When power is supplied to the coil 320 wound around the core 330, driving force capable of rotating the rotor 200 by electromagnetic interaction between the magnet 220 and the core 330 having the coil 320 wound therearound may be generated.

Therefore, when the rotor 220 rotates, the shaft 110 to which the rotor 200 is fixedly coupled may also rotate together with the rotor 200.

The rotor 200 may allow lubricating fluid to be sealed between the rotor 200 and an outer peripheral surface of an upper portion of the sleeve housing 140, and include a main wall part 216 protruding downwardly from one surface of the rotor 200 in the axial direction so that the lubricating fluid is sealed.

That is, the main wall part 216 may protrude from one surface of the rotor 200, which is the rotating member, to allow the lubricating fluid to be sealed between the main wall part 216 and the sleeve housing 140, which is a fixed member.

More specifically, the main wall part 216 is extended along the outer peripheral surface of the sleeve housing 140, which is the fixed member, so that an interface between the lubricating fluid and air may be formed between an inner peripheral surface of the main wall part 216 and the outer peripheral surface of the upper portion of the sleeve housing 140.

In addition, a lower surface of the main wall part 216 may be formed to face the base member 310 to which the sleeve housing 140 is fixed.

Figure 2:
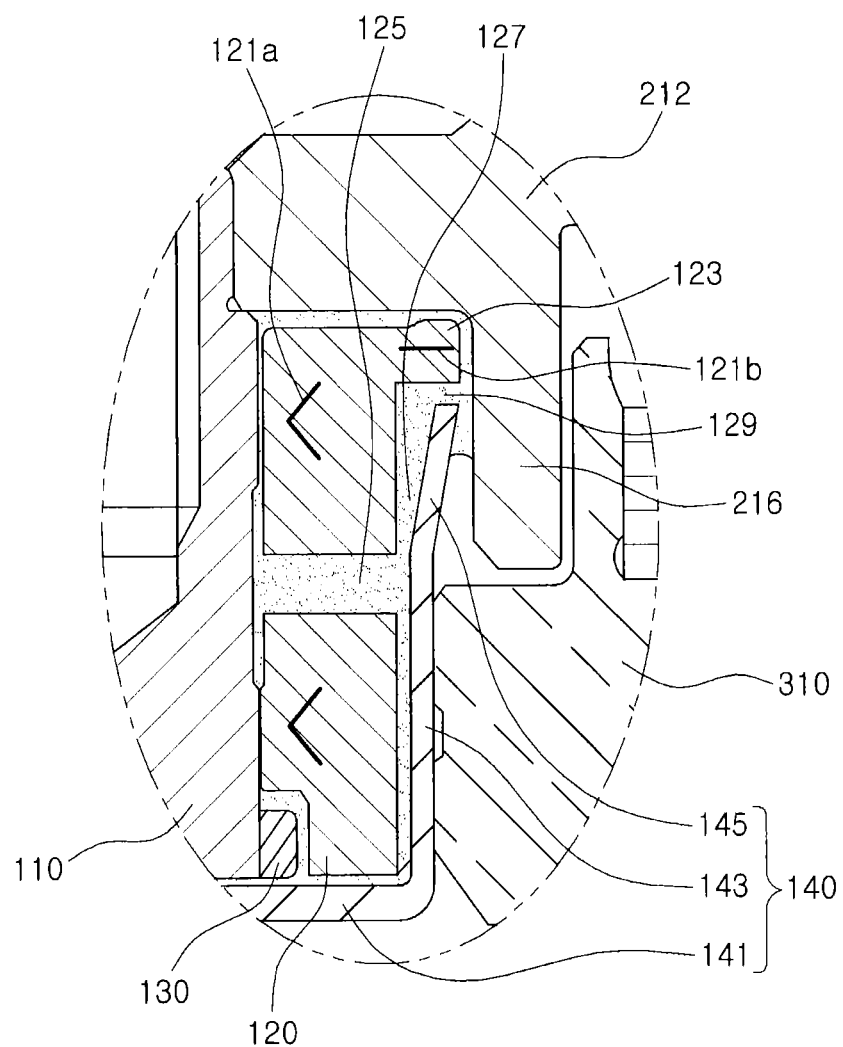
FIG. 2 is an enlarged cross-sectional view of part A of FIG. 1.

FIG. 2 is an enlarged cross-sectional view of part A of FIG. 1; FIG. 3 is a cross-sectional view showing a state in which the sleeve and the rotor case according to the embodiment of the present invention are coupled to each other; and FIG. 4 is an exploded perspective view of the shaft, the sleeve, the thrust plate, the sleeve housing, and the rotor case according to the embodiment of the present invention.

Figure 3:
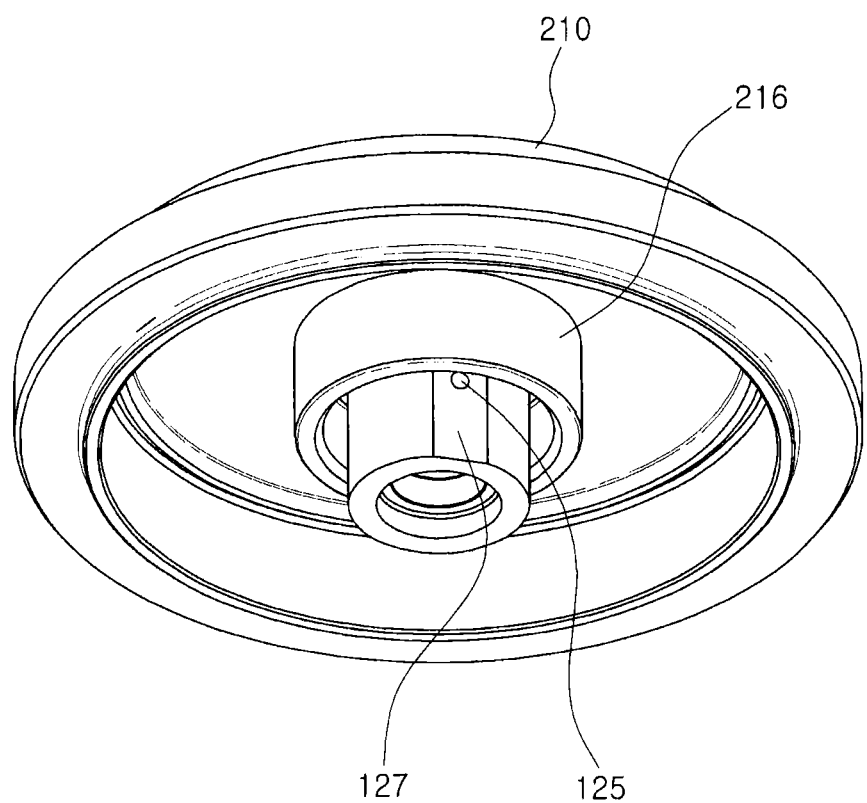
FIG. 3 is a cross-sectional view showing a state in which a sleeve and a rotor case according to the embodiment of the present invention are coupled to each other.
Figure 4:
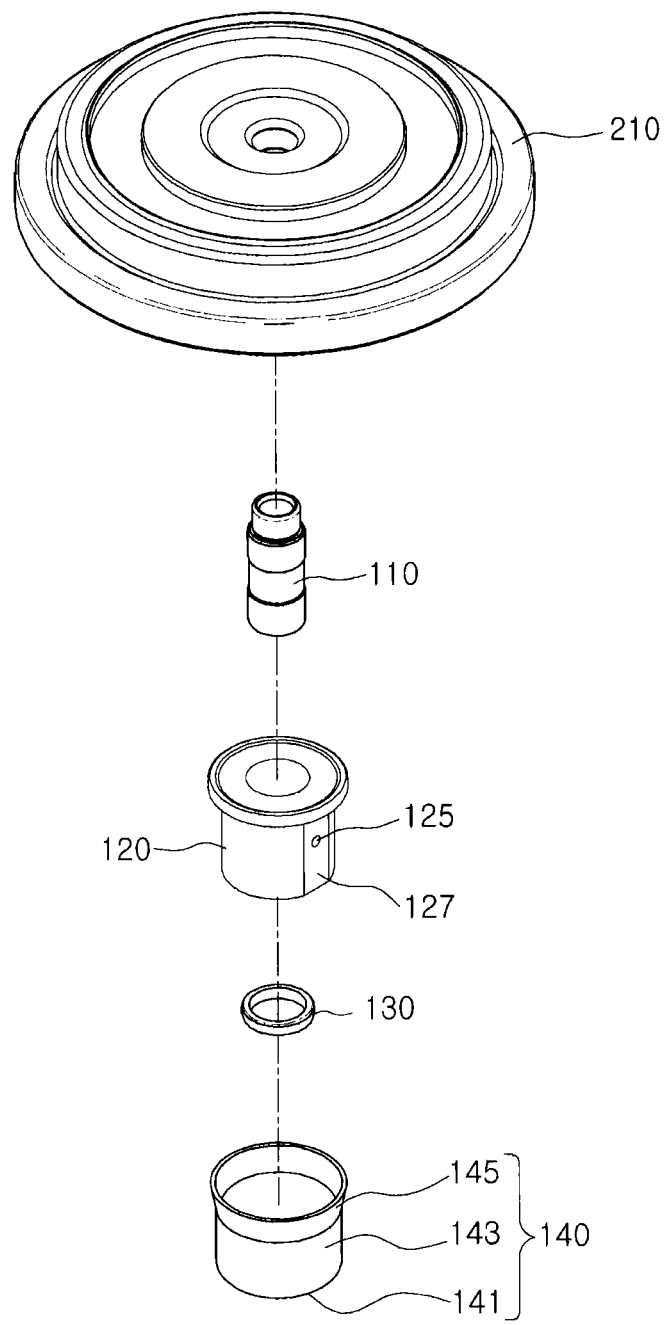
FIG. 4 is an exploded perspective view of a shaft, the sleeve, a thrust plate, a sleeve housing, and the rotor case according to the embodiment of the present invention.

Referring to FIGS. 2 through 4, the hydrodynamic bearing assembly 100 according to the embodiment of the present invention may include the shaft 110, the sleeve 120, the thrust plate 130, and the sleeve housing 140.

The sleeve 120 may support the shaft 110 such that an upper end of the shaft 110 protrudes upwardly in the axial direction, and may be formed by forging Cu or Al or sintering Cu—Fe based alloy powder or SUS based powder.

Here, the shaft 110 may be inserted into a shaft hole of the sleeve 120 while having a micro clearance therebetween. The micro clearance may be filled with the lubricating fluid, and the rotation of the shaft 110 may be more smoothly supported by a radial dynamic pressure groove 121$a$ formed in at least one of an outer diameter portion of the shaft 110 and an inner diameter portion of the sleeve 120.

The radial dynamic pressure groove 121$a$ may be formed in an inner peripheral surface of the sleeve 120, which is an inner portion of the shaft hole of the sleeve 120, and generate pressure so that the shaft 110 may smoothly rotate in a state in which the shaft 110 is spaced apart from the inner peripheral surface of the sleeve 120 by a predetermined interval at the time of rotation thereof.

However, the radial dynamic pressure groove 121$a$ is not limited to being formed in the inner peripheral surface of the sleeve 120 as described above, but may also be formed in an outer peripheral surface of the shaft 110. In addition, the number of radial dynamic pressure grooves 121a is not limited.

The radial dynamic pressure groove 121a may have any one of a herringbone shape, a spiral shape, and a helical shape. However, the radial dynamic pressure groove 121a may have any shape as long as radial dynamic pressure may be generated thereby.

In addition, a thrust dynamic pressure groove 121b may be formed in at least one of an upper surface of the sleeve 120 and one surface of the rotor 200 facing the upper surface of the sleeve 120, and the rotor 200 may rotate together with the shaft 110 in a state in which predetermined floating force is secured by the thrust dynamic pressure groove 121b.

Here, the thrust dynamic pressure groove 121b may have a herringbone shape, a spiral shape, or a helical shape, similar to the radial dynamic pressure groove 121a. However, the thrust dynamic pressure groove 121b is not necessarily limited to having the above-mentioned shape, but may have any shape as long as thrust dynamic pressure may be provided thereby.

An upper portion of the sleeve 120 may be provided with a protrusion part 123 protruding in the outer radial direction.

An upper surface of the protrusion part 123 may be provided with the thrust dynamic pressure groove 121b, and a lower surface thereof may contact an upper surface of the sleeve housing 140 to be described below.

Meanwhile, an inner peripheral surface of a lower portion of the sleeve 120 may be provided with a step in the outer radial direction so as to receive the thrust plate 130 to be described below.

A first circulation hole 125 penetrating between the inner and outer peripheral surfaces of the sleeve 120 may be formed in the sleeve 120, and at least one groove may be formed in the outer peripheral surface of the sleeve 120 in the axial direction.

When the sleeve 120 is coupled to the sleeve housing 140, a second circulation hole 127 may be formed by the groove formed in the outer peripheral surface of the sleeve 120 and an inner peripheral surface of the sleeve housing 140, and the second circulation hole 127 may be in communication with the first circulation hole 125.

The first and second circulation holes 125 and 127 may disperse pressure in the lubricating fluid inside the hydrodynamic bearing assembly 100 to maintain a balance in the pressure of the lubricating fluid and allow air bubbles, or the like, present in the hydrodynamic bearing assembly 100 to be discharged by circulation.

Here, the second circulation hole 127 may be formed by cutting a portion of the outer peripheral surface of the sleeve 120 in the axial direction.

More specifically, the second circulation hole 127 may be formed by cutting the outer peripheral surface of the sleeve 120 from the lower portion of the sleeve 120 to the lower surface of the protrusion part 123 in the axial direction.

Therefore, a micro clearance may be formed between the sleeve 120 and the sleeve housing 140 enclosing the outer peripheral surface of the sleeve 120, and the second circulation hole 127 may be formed by the micro clearance.

Further, an upper portion of the second circulation hole 127 may be larger than a lower portion thereof in the axial direction, and the upper portion of the second circulation hole 127 having a relatively large diameter may be used as a storage space for the lubricating fluid.

The sleeve 120 may be inserted into the sleeve housing 140.

That is, the inner peripheral surface of the sleeve housing 140 and the outer peripheral surface of the sleeve 120 may be coupled to each other by at least one of a sliding method, an adhesive method, a welding method, and a press-fitting method.

Here, the sleeve housing 140 may be manufactured by plastically deforming a lightweight alloy steel sheet such as a cold rolled steel sheet (SPCC, SPCE, or the like), a hot rolled steel sheet, a stainless steel, a boron or magnesium alloy, or the like.

The sleeve housing 140 may include a closing part 141 disposed below the shaft 110 and the sleeve 120, an extension part 143 extended from the closing part 141 in the axial direction and coupled to the sleeve 120, and a tapered part 145 extended from the extension part 143 and having an inner diameter gradually increased upwardly in the axial direction.

The closing part 141 may receive the lubricating fluid in a clearance formed between the closing part 141, the shaft 110, and the sleeve 120 to thereby serve as a bearing supporting the lower surface of the shaft 110.

The extension part 143 may be bent and extended upwardly from the closing part 141 in the axial direction, and an inner peripheral surface of the extension part 143 may be coupled to the outer peripheral surface of the sleeve 120.

Here, the second circulation hole 127 may be formed between the inner peripheral surface of the extension part 143 and the outer peripheral surface of the sleeve 120 by the groove formed in the outer peripheral surface of the sleeve 120 in the axial direction.

In addition, an outer peripheral surface of the extension part 143 may be fixedly coupled to the base member 310, which is the fixed member.

The tapered part 145 may be extended upwardly from the extension part 143 in the axial direction, and the inner diameter thereof may be increased upwardly in the axial direction.

Therefore, the second circulation hole 127 may be formed between the outer peripheral surface of the sleeve 120 and an inner peripheral surface of the tapered part 145, and a diameter of the second circulation hole 127 formed between the outer peripheral surface of the sleeve 120 and the inner peripheral surface of the tapered part 145 may be larger than that of the second circulation hole 127 formed between the outer peripheral surface of the sleeve 120 and the inner peripheral surface of the extension part 143.

That is, since the upper portion of the second circulation hole 127 has a larger diameter than the lower portion thereof in the axial direction, the upper portion of the second circulation hole may be used as the storage space for the lubricating fluid.

Further, the tapered part 145 may have an outer diameter increasing toward an upper portion thereof in the axial direction to seal the lubricating fluid between the tapered part 145 and the main wall part 216.

Therefore, a sealing part may be formed between an outer peripheral surface of the tapered part 145 and the inner peripheral surface of the main wall part 216 protruding from one surface of the rotor 200 to seal the lubricating fluid therein.

Meanwhile, a communication channel 129 may be formed between an upper surface of the tapered part 145 and the lower surface of the protrusion part 123 may included so that it may allow the second circulation hole 127 to be in communication with the outside of the sleeve housing 140.

The upper surface of the tapered part 145 and the lower surface of the protrusion part 123 may contact each other, but a portion of the lower surface of the protrusion part 123 may be recessed upwardly in the axial direction to form the communication channel 129.

Therefore, the communication channel 129 may be formed between the upper surface of the tapered part 145 and the lower surface of the protrusion part 123 and be in communication with the second circulation hole 127.

The first and second circulation holes 125 and 127 and the communication channel 129 may equally maintain the pressure inside the hydrodynamic bearing assembly 100, suppress generation of negative pressure, and allow air bubbles, or the like, present in the hydrodynamic bearing assembly 100 to be discharged by circulation.

The thrust plate 130 may be disposed at the lower portion of the sleeve 120 in the axial direction and received in the step formed in the inner peripheral surface of the sleeve 120 in the outer radial direction.

The thrust plate 130 may include a hole corresponding to a cross section of the shaft 110 at the center thereof, thereby allowing the shaft 110 to be inserted into the hole.

The thrust plate 130 may be formed to have an outer diameter sufficient to maintain a balance in the case in which the shaft 110 is inserted into the hole of the thrust plate 130.

The thrust plate 130 may be separately manufactured and then coupled to the shaft 110. However, the thrust plate 130 may be formed integrally with the shaft 110 at the time of manufacturing thereof. The thrust plate 130 may rotate together with the shaft 110 at the time of rotation of the shaft 110.

Figure 5A:
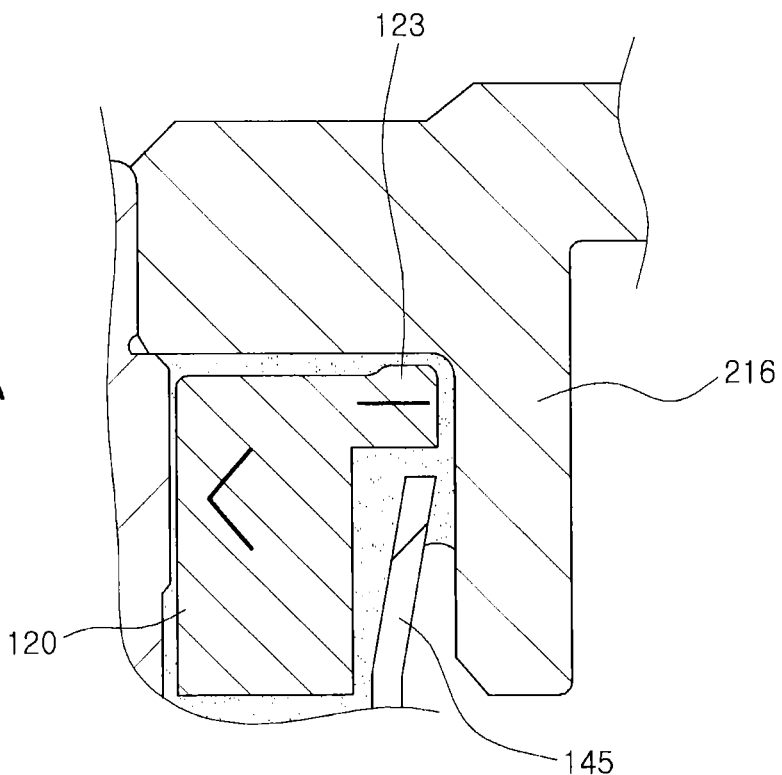
FIG. 5A is a schematic cross-sectional view showing a state in which lubricating fluid is sealed at the time of initial driving of the motor according to the embodiment of the present invention.
Figure 5B:
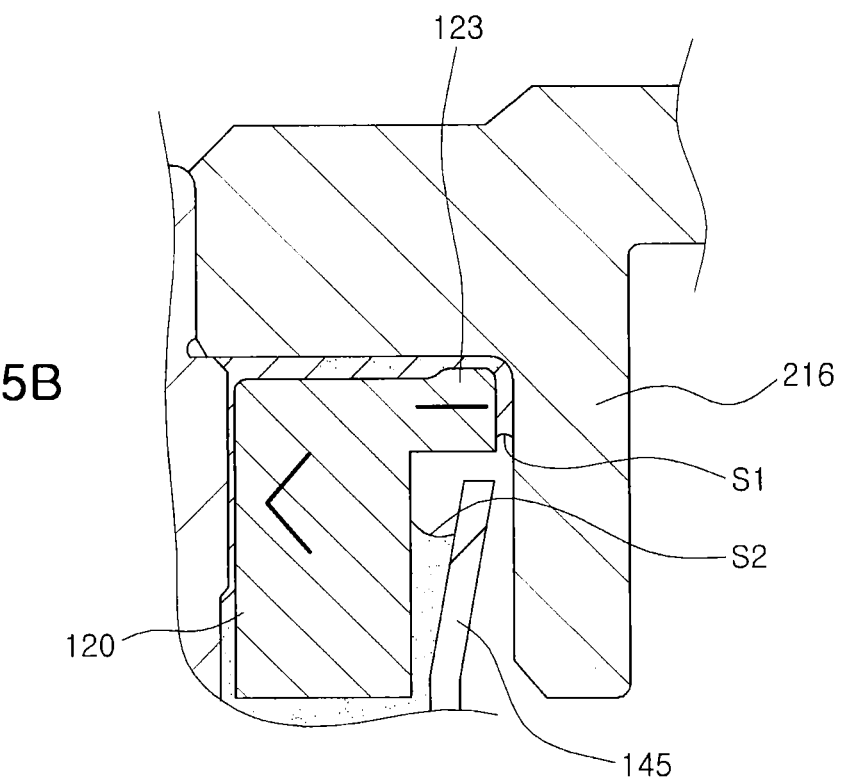
FIG. 5B is a schematic cross-sectional view showing a state in which lubricating fluid is evaporated and an amount of the lubricating fluid is reduced while the motor according to the embodiment of the present invention is driven.

FIG. 5A is a schematic cross-sectional view showing a state in which the lubricating fluid is sealed at the time of initial driving of the motor according to the embodiment of the present invention; and FIG. 5B is a schematic cross-sectional view showing a state in which the lubricating fluid is evaporated and an amount of the lubricating fluid is reduced while the motor according to the embodiment of the present invention is driven.

Hereinafter, effects of the hydrodynamic bearing assembly 100 according to the embodiment of the present invention may be described with reference to FIGS. 5A and 5B.

The amount of the lubricating fluid in the hydrodynamic bearing assembly may be reduced by leakage or evaporation of the lubricating fluid generated during the driving of the motor. Due to this phenomenon, the hydrodynamic bearing may fail to generate pressure, a problem in performance and a lifespan of the motor may be generated.

As shown in FIG. 5A, at the time of initial driving of the motor, the sealing part is formed between the outer peripheral surface of the tapered part 145 and the inner peripheral surface of the main wall part 216. However, when the amount of the lubricating fluid is reduced due to leakage or evaporation of the lubricating fluid, the sealing part may be divided into first and second sealing parts S1 and S2 as shown in FIG. 5B.

That is, when the amount of the lubricating fluid is reduced, the first sealing part S1 may be formed between an outer peripheral surface of the protrusion part 123 and the inner peripheral surface of the main wall part 216, and the second sealing part S2 may be formed between the outer peripheral surface of the sleeve 120 and the inner peripheral surface of the tapered part 145.

Here, since a relatively large space in which the second sealing part S2 is formed may be formed between the outer peripheral surface of the sleeve 120 and the inner peripheral surface of the tapered part 145, when the space is fully filled with air containing the evaporated lubricating fluid, the evaporation of the lubricating fluid from the second sealing part S2 may be suppressed.

Therefore, since the storage space for the lubricating fluid may be increased in the hydrodynamic bearing assembly 100 according to the embodiment of the present invention, even though the leakage or evaporation of the lubricating fluid is generated during the driving of the motor, the lifespan of the motor may be increased. Further, in the case in which the amount of the lubricating fluid is reduced, the evaporation of the lubricating fluid from the second sealing part S2 is suppressed, and thus, the lifespan of the motor may be extended.

As set forth above, in a hydrodynamic bearing assembly and a motor including the same according to embodiments of the present invention, a storage space for lubricating fluid may be increased and evaporation of the lubricating fluid may be suppressed, whereby a lifespan of the motor may be increased.

While the present invention has been shown and described in connection with the embodiments, it will be apparent to those skilled in the art that modifications and variations can be made without departing from the spirit and scope of the invention as defined by the appended claims.

What is claimed is:

1. A hydrodynamic bearing assembly comprising:
   a sleeve rotatably supporting a shaft and including a first circulation hole formed therein, the first circulation hole penetrating between an inner peripheral surface thereof and an outer peripheral surface thereof;
   a sleeve housing into which the sleeve is inserted; and
   a second circulation hole formed between the outer peripheral surface of the sleeve and an inner peripheral surface of the sleeve housing to be in communication with the first circulation hole,
   wherein an upper portion of the second circulation hole has a larger volume than that of a lower portion of the second circulation hole in an axial direction, and a cross sectional area of the second circulation hole increases upwardly in the axial direction.

2. The hydrodynamic bearing assembly of claim 1, wherein the sleeve housing includes:
   a closing part disposed below the shaft and the sleeve;
   an extension part extended from the closing part in the axial direction and coupled to the sleeve; and
   a tapered part extended from the extension part and having an inner diameter increasing upwardly in the axial direction.

3. The hydrodynamic bearing assembly of claim 2, wherein the tapered part has an outer diameter increasing upwardly in the axial direction.

4. The hydrodynamic bearing assembly of claim 2, wherein the second circulation hole formed between an inner peripheral surface of the tapered part and the outer peripheral surface of the sleeve has a volume increasing upwardly in the axial direction.

5. The hydrodynamic bearing assembly of claim 1, wherein the sleeve housing is formed by plastically deforming a steel sheet.

6. The hydrodynamic bearing assembly of claim 1, wherein an upper portion of the sleeve is provided with a protrusion part protruding in an outer radial direction.

7. The hydrodynamic bearing assembly of claim 6, wherein a communication channel is formed between an upper surface of the sleeve housing and a lower surface of the protrusion part so that the second circulation hole is in communication with an outside of the sleeve housing.

8. The hydrodynamic bearing assembly of claim 1, wherein the second circulation hole is formed by cutting a portion of the outer peripheral surface of the sleeve.

9. The hydrodynamic bearing assembly of claim 1, further comprising a rotor fixed to the shaft to rotate together with the shaft.

10. The hydrodynamic bearing assembly of claim 9, wherein the rotor includes a main wall part protruding from one surface thereof to face an outer peripheral surface of the sleeve housing.

11. The hydrodynamic bearing assembly of claim 10, wherein the outer peripheral surface of the sleeve housing and an inner peripheral surface of the main wall part form a sealing part therebetween, the sealing part allowing a lubricating fluid to be sealed.

12. The hydrodynamic bearing assembly of claim 10, wherein an outer peripheral surface of an upper portion of the sleeve housing is tapered to seal the lubricating fluid between the outer peripheral surface of the upper portion of the sleeve housing and the inner peripheral surface of the main wall part.

13. A motor comprising:
   the hydrodynamic bearing assembly of claim 1; and
   a stator coupled to the hydrodynamic bearing assembly and including a core having a coil wound therearound in order to generate rotational driving force.

\* \* \* \* \*